United States Patent
Efseaff et al.

(10) Patent No.: US 12,423,213 B2
(45) Date of Patent: Sep. 23, 2025

(54) SYSTEMS AND METHODS FOR STATE MACHINE-BASED ORCHESTRATION OF PERFORMANCE TESTING FOR CLOUD COMPUTING RESOURCES

(71) Applicant: Capital One Services, LLC, McLean, VA (US)

(72) Inventors: Nicholas Efseaff, Washington, DC (US); Alexander Misihowsky, Jersey City, NJ (US); Mohan Kumar Arja, Newark, DE (US); Theodore Timothy John, West Chester, PA (US); Nicholas Visalli, Baltimore, MD (US); Andrew Yocca, Dana Point, CA (US)

(73) Assignee: Capital One Services, LLC, McLean, VA (US)

( * ) Notice: Subject to any disclaimer, the term of this patent is extended or adjusted under 35 U.S.C. 154(b) by 242 days.

(21) Appl. No.: 18/360,951

(22) Filed: Jul. 28, 2023

(65) Prior Publication Data
US 2025/0036543 A1    Jan. 30, 2025

(51) Int. Cl.
*G06F 11/34* (2006.01)
*G06F 9/448* (2018.01)
(Continued)

(52) U.S. Cl.
CPC ........ *G06F 11/3495* (2013.01); *G06F 9/4498* (2018.02); *G06F 9/4881* (2013.01); *G06F 11/3688* (2013.01)

(58) Field of Classification Search
CPC .. G06F 11/3688; G06F 9/4881; G06F 9/4498; G06F 11/3495
See application file for complete search history.

(56) References Cited

U.S. PATENT DOCUMENTS 9,811,451 B1 * 11/2017 Arguelles ............ G06F 11/3688
9,934,016 B1    4/2018 Acosta et al.
(Continued)

FOREIGN PATENT DOCUMENTS

CN    108845949 A  * 11/2018
CN    109075991 A  * 12/2018  ........... H04L 41/046
(Continued)

OTHER PUBLICATIONS

Khatri et al., "Performance Testing Approach for Enterprise Application comprising Serverless Component" (Year: 2021).*

*Primary Examiner* — Phillip H Nguyen
(74) *Attorney, Agent, or Firm* — Bookoff McAndrews, PLLC

(57) ABSTRACT

Disclosed are methods and systems for orchestrating application performance testing using state machines. For instance, at least a portion of information included in a request to run a performance test on an application may be received, the portion including each component of the application. Each component of the application may be deployed in a performance testing environment, and a script for the performance test may be generated based on one or more application performance metrics associated with the application. The performance test may be generated in accordance with the script and run on the application in the performance testing environment. Upon detecting a completion of the performance test, each component of the application deployed in the performance testing environment may be destroyed.

20 Claims, 8 Drawing Sheets

(51) Int. Cl.
    *G06F 9/48*         (2006.01)
    *G06F 11/3668*    (2025.01)

(56) References Cited

U.S. PATENT DOCUMENTS

| | | | |
|---|---|---|---|
| 10,613,970 | B1 | 4/2020 | Jammula et al. |
| 10,853,228 | B2 | 12/2020 | Kommera et al. |
| 11,314,628 | B2 | 4/2022 | Vijayvergia et al. |
| 2012/0254660 | A1* | 10/2012 | He .................. G06F 11/3688 |
| | | | 714/E11.178 |
| 2017/0103014 | A1* | 4/2017 | Segler ................ G06F 11/3442 |
| 2017/0351598 | A1* | 12/2017 | Rauenzahn ......... G06F 11/3688 |
| 2018/0210814 | A1* | 7/2018 | Mevorach ........... G06F 11/3688 |
| 2021/0182180 | A1* | 6/2021 | Luecke ................. G06N 20/00 |
| 2022/0100649 | A1* | 3/2022 | Pönitsch ............. G06F 11/3688 |
| 2023/0161694 | A1* | 5/2023 | De Sousa Bispo ... G06F 11/302 |
| | | | 702/186 |

FOREIGN PATENT DOCUMENTS

| | | | | |
|---|---|---|---|---|
| EP | 2833267 | A1 * | 2/2015 | .......... G06F 11/3414 |
| KR | 20090082341 | A * | 7/2009 | .......... G01R 31/2834 |

* cited by examiner

SYSTEMS AND METHODS FOR STATE MACHINE-BASED ORCHESTRATION OF PERFORMANCE TESTING FOR CLOUD COMPUTING RESOURCES

TECHNICAL FIELD

Various embodiments of this disclosure relate generally to techniques for orchestrating performance testing for cloud computing resources, and, more particularly, to systems and methods for orchestrating performance testing for applications using state machines.

BACKGROUND

Resource management tools may scan a cloud computing environment to look for patterns or resources with low utilization using rule-based engines, for example, to determine which resources are not being used or are computationally wasteful, and thus may not be necessary in the production environment. One aspect of resource management may include performance testing of resources, such as applications, prior to deployment into the production environment.

Performance tests are intended to test the performance of an application at production scale. In addition to enabling spotting of compute under-utilization, performance tests help discover issues that only occur when the application is under load. These issues include, but are not limited to, memory leaks, slow database query times, incorrect scaling policies, and/or non-functioning self-healing capabilities. Further, performance tests may help development teams understand the end-user experience to enable informed decisions about upcoming application releases.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for orchestrating performance testing for cloud computing resources. The methods and systems may include orchestrating performance testing for applications using state machines.

In some aspects, methods for orchestrating application performance testing using state machines may be described. An example method may include receiving a request to run a performance test on an application, where at least a portion of information received as part of the request includes one or more infrastructure components of the application and one or more services of the application, generating a unique identifier for a state machine assigned to orchestrate the performance test, and providing at least the portion of the information and the unique identifier to the state machine. The example method may also include creating, by the state machine, a performance testing environment for the application by causing a deployment of each of the one or more infrastructure components and the one or more services of the application in the performance testing environment, where each deployment is associated with the unique identifier, generating, by the state machine, a script for the performance test based on one or more application performance metrics associated with the application, and causing, by the state machine, a performance test to be generated in accordance with the script and run on the application in the performance testing environment. The example method may further include upon detecting a completion of the performance test, destroying, by the state machine, the performance testing environment by causing a destruction of each of the one or more infrastructure components and the one or more services of the application deployed in the performance testing environment in association with the unique identifier.

In other aspects, systems for orchestrating application performance testing using state machines may be described. An example system may include at least one memory storing instructions, and at least one processor configured to execute the instructions to cause a state machine to perform operations. The operations may include receiving at least a portion of information included in a request to run a performance test on an application, the portion including each component of the application, retrieving, from a code hosting system, a configuration file for each component of the application, and modifying a copy of the configuration file using a library to remove any information from the configuration file related to environments other than a performance testing environment. The operations may also include causing a deployment of each component of the application in the performance testing environment based on the modified copy of the configuration file, generating a script for the performance test based on one or more application performance metrics associated with the application, and causing a performance test to be generated in accordance with the script and run on the application in the performance testing environment. The operations may further include, upon detecting a completion of the performance test, causing a destruction of each component of the application in the performance testing environment.

In further aspects, methods for orchestrating application performance testing using state machines may be described. An example method may include receiving at least a portion of information included in a request to run a performance test on an application, the portion including each component of the application. The example method may also include causing a deployment of each component of the application in a performance testing environment in a first order, generating a script for the performance test based on one or more application performance metrics associated with the application, and causing the performance test to be generated in accordance with the script and run on the application in the performance testing environment. The example method may further include, upon detecting a completion of the performance test, causing destruction of each component of the application deployed in the performance testing environment in a second order that is a reverse order of the first order.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
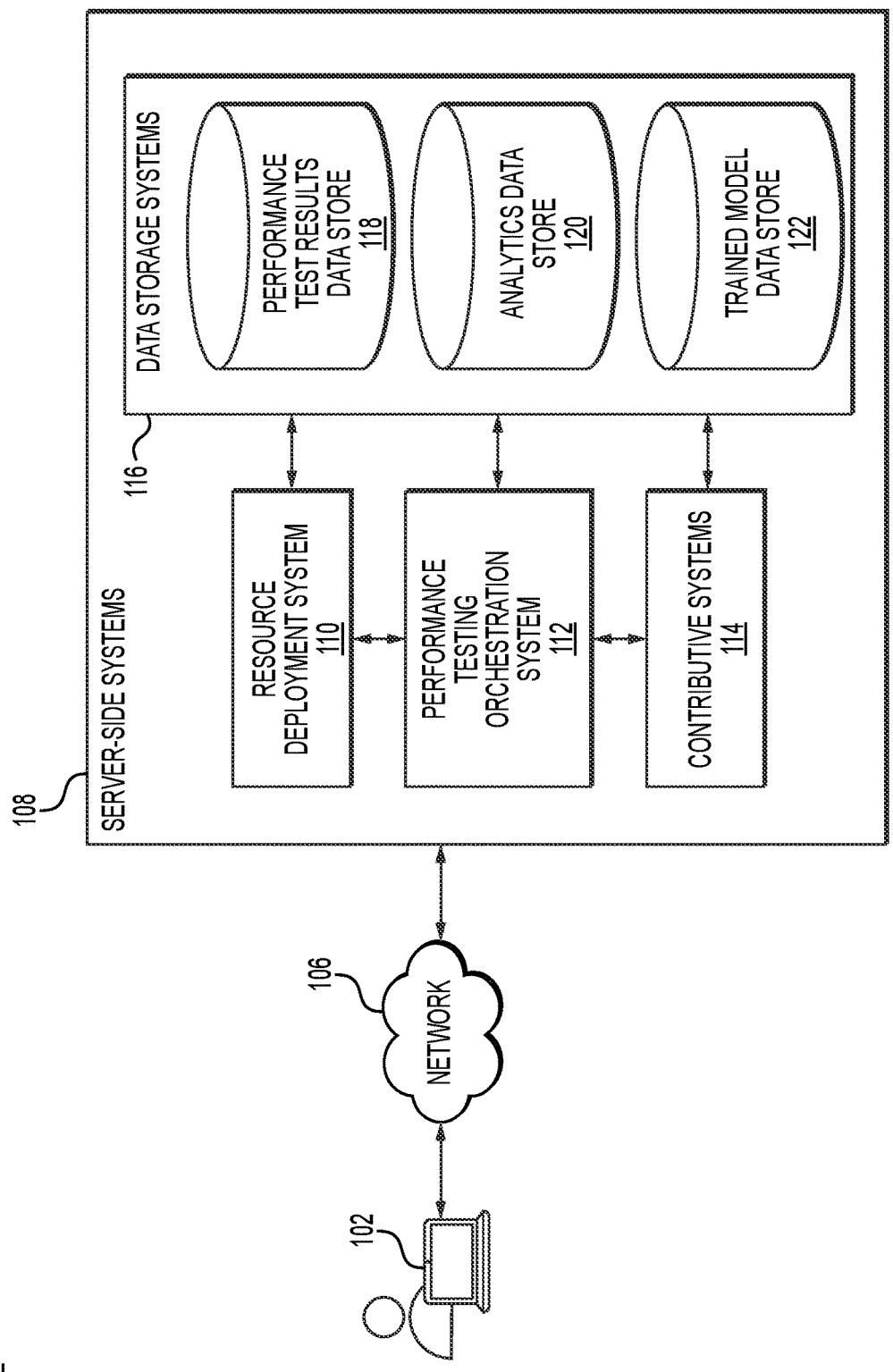
FIG. 1 depicts an exemplary environment for orchestrating performance testing for cloud computing resources, according to certain embodiments.

According to certain aspects of the disclosure, methods and systems are disclosed for orchestrating performance testing for cloud computing resources. As will be discussed in more detail below, in various embodiments, systems and methods are described for orchestrating performance testing for applications using state machines.

As briefly discussed above, performance testing of applications is one example resource management tool used by development teams to spot compute under-utilization, discover load-based application issues, and/or understand end-user experience. However, for an entity that provides a plurality of applications, if each development team associated with one of the applications were to create a performance test environment to test every resource deployment daily, that may result in thousands of performance tests run within thousands of performance test environments created daily. Once the performance tests are run, the performance test environments then need to be destroyed.

Conventional management of resources, including performance testing-related management, utilizes proactive or reactive-based management tools rather than tools that can manage a lifecycle of a resource in real-time. As one example, some tools may be reactive to a resource's state in production. As another example, other tools may implement proactive measures to prevent access to a resource in production. Without having systems or frameworks in place that can (1) manage a full lifecycle of the application throughout test environment creation, performance testing, and test environment destruction, and (2) implement isolation mechanisms to decouple the testing from production, a large volume of performance testing may increase the entity's risk for system failures, particularly when multiple performance tests are being run concurrently or in parallel. Example failures may result from performance tests being run on incorrect environments, incomplete destruction of the environments, and/or performance test runs affecting production.

To address these challenges, systems and methods are described herein for orchestrating performance testing of computing resources, such as applications, using state machines. As described in detail throughout the disclosure, the state machines are configured to manage resource creation with guaranteed traceability throughout a lifecycle of the resource. Additionally, one or more isolation mechanisms may be implemented by the state machines and/or one or more contributive systems prior to resource creation to help ensure the performance testing is decoupled from the production.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms.

Terms like "provider," "services provider," or the like may generally encompass an entity or person involved in providing, selling, and/or renting items to persons, as well as an agent or intermediary of such an entity or person. An "item" may generally encompass a good, service, or the like having ownership or other rights that may be transferred. As used herein, terms like "developer" or "user" generally encompass any person or entity that may develop new and/or modify existing computing resources that can be performance tested prior to and/or throughout deployment. The term "computing resource" may include an application that is provided to persons by a provider (e.g., an application that is deployed and hosted by the provider). The term "application" may be used interchangeably with other terms like "program," or the like, and generally encompasses software that is configured to interact with, modify, override, supplement, or operate in conjunction with other software.

As used herein, a "state machine" may be a model or algorithm that includes a plurality of states. Based on a current state and a given input (e.g., event), the state machine performs state transitions and produces outputs. In some examples, the state machine may be a directed acyclic graph (DAG). The term "machine learning model" may generally encompass instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

In an exemplary use case, a request to run a performance test on an application may be received. A state machine may be assigned to the request, and a unique identifier may be generated for the state machine such that any resource created or deployed throughout the performance testing process may be associated with the unique identifier to enable traceability and facilitate subsequent destruction of the resource. The state machine may execute a plurality of step functions to cause (e.g., to provide instructions to) one or more contributive systems to create a performance test environment, run the performance test in the performance test environment, and destroy the performance test environment after the performance test is complete.

For example, the state machine may create the performance testing environment for the application by causing a deployment of each application component in the performance testing environment. Each application component may be deployed in a first order, and each deployment may be associated with the unique identifier. Additionally, prior to the deployment, one or more code containing configuration files for each application component used for the deployment, may be scanned and modified, if necessary, to remove any information related to environments other than the performance test environment to isolate or decouple the performance testing from production, for example.

The state machine may generate a script for the performance test based on one or more application performance metrics associated with the application, and cause a performance test to be generated in accordance with the script and run on the application in the performance testing environment. The application performance metrics may be dynamically generated based on data received from an application monitoring system at predefined intervals. In some examples, the application performance metrics may be predicted by a trained machine learning model.

Upon detecting a completion of the performance test, the state machine may destroy the performance testing environment by causing a destruction of each application component that was deployed in the performance testing environment in association with the unique identifier. For example, the unique identifier may be used to identify the application components for destruction. Additionally, each application component may be destroyed in a second order that is a reverse order of the first order in which the application components were deployed. Destruction in the second, reverse order enables a clean destruction of the application in the performance testing environment to prevent loss of data and/or avoid potential errors.

In some examples, a plurality of requests to run performance tests on a plurality of different applications may be received at a given time. In such examples, orchestration of performance testing for each of the different applications, including environment creation, performance testing, and environment destruction, may be performed concurrently or in parallel. For example, by assigning a separate state machine to each request and generating a unique state machine identifier for each state machine that is associated with each resource created or deployed throughout the orchestration, performance testing for each of the different applications may remain isolated. The isolation helps to ensure that performance testing of one application does not affect another as resources are being deployed, tests are being run, and/or resources are being destroyed.

In further examples, the performance testing may be implemented in parallel with a deployment pipeline or system. In such examples, the request may be received automatically in response to a new application and/or a modified existing application being received for deployment by the deployment system. A result of the performance test (e.g., pass or fail) may be provided to the deployment system, and the deployment system may automatically deploy or alternatively continue to hold or prevent the application from deploying based on the result.

While specific examples included throughout the present disclosure involve applications on which performance testing is run, it should be understood that techniques according to this disclosure may be adapted to other types of computing resources that have a temporal lifespan and have a traceable lifecycle throughout that lifespan. It should also be understood that the examples above are illustrative only. The techniques and technologies of this disclosure may be adapted to any suitable activity.

Presented below are various aspects of machine learning techniques that may be adapted for predicting application performance metrics. As will be discussed in more detail below, the machine learning techniques may include one or more aspects according to this disclosure, e.g., a particular selection of training data, a particular training process for the machine learning system, operation of the machine learning system in conjunction with particular data, modification of such particular data by the machine learning system, etc., and/or other aspects that may be apparent to one of ordinary skill in the art based on this disclosure.

FIG. 1 depicts an exemplary environment 100 for orchestrating performance testing for cloud computing resources, according to certain embodiments, and which may be used with the techniques presented herein. A computing device 102 of a user may communicate with one or more of the other components of the environment 100 across electronic network 106, including one or more server-side systems 108, discussed below, to initiate orchestration of a performance test for a computing resource, such as an application, and receive results of the performance testing. The environment 100 of FIG. 1 shows one computing device 102. However, in other examples, there may be a plurality of computing devices 102 that are each communicating with one or more server-side systems 108 to initiate orchestration of a performance test for a different computing resource.

The server-side systems 108 may include a resource deployment system 110, a performance testing orchestration system 112 (herein referred to as orchestration system 112), a plurality of contributive systems 114, and/or a plurality of data storage systems 116, among other systems. In some embodiments, the resource deployment system 110, the orchestration system 112, one or more of the contributive systems 114, and/or one or more of the data storage systems 116, may be associated with a common entity, e.g., a provider of the resources or applications. In such an embodiment, the server-side systems 108 associated with the common entity may be part of a cloud service computer system (e.g., in a data center).

In other embodiments, one or more of the components of the environment 100 may be associated with a different entity than another. For example, the resource deployment system 110 may be associated with the provider, and the orchestration system 112, one or more of the contributive systems 114, and/or one or more of the data storage systems 116 may be associated with one or more third parties that provide performance testing orchestration-related services or data storage services to the provider.

The above-provided examples are exemplary and non-limiting. The systems and devices of the environment 100 may communicate in any arrangement. As will be discussed herein, systems and/or devices of the environment 100 may communicate in order to enable performance testing orchestration, among other activities.

The computing device 102 may be configured to enable the user to access and/or interact with other systems in the environment 100. For example, the computing device 102 may be a computer system such as, for example, a desktop computer, a laptop computer, a tablet, a smart cellular phone, a smart watch or other electronic wearable, etc. In some embodiments, the computing device 102 may include one or more electronic applications, e.g., a program, plugin, browser extension, etc., installed on a memory of the computing device 102. In some embodiments, the electronic applications may be associated with one or more of the other components in the environment 100. For example, a first application associated with the resource deployment system 110 and/or a second application associated with the orchestration system 112, among other example applications, may be executed on the computing device 102 to enable initiation of the performance testing orchestration services. In some examples, the applications may be thick client applications installed locally on the computing device 102 and/or thin client applications (e.g., web applications) that are rendered via the web browser launched on the computing device 102.

Additionally, one or more components of the computing device 102 may generate, or may cause to be generated, one or more graphic user interfaces (GUIs) based on instructions/information stored in the memory, instructions/information received from the other systems in the environment 100, and/or the like and may cause the GUIs to be displayed via a display of the computing device 102. The GUIs may be, e.g., application interfaces or browser user interfaces and may include text, input text boxes, selection controls, and/or the like. The display may include a touch screen or a display with other input systems (e.g., a mouse, keyboard, etc.) for the user to control the functions of computing device 102.

The resource deployment system 110 may include one or more server devices (or other similar computing devices) for executing deployment services. For example, the user may utilize the resource deployment system 110 to deploy new applications and/or deploy modified versions of existing applications (e.g., modified applications) developed by the user into a production environment. In some aspects, to ensure adequate performance in the production environment, the new and/or modified applications may be deployed and performance tested in a separate test environment (e.g., an isolated compute environment) that simulates the production environment prior to deployment. The orchestration system 112 may be configured to orchestrate the performance testing, as described in greater detail below. In some examples, the resource deployment system 110 may hold or otherwise prevent the new and/or modified applications from deploying until a performance test result indicating a pass is received from the orchestration system 112.

The orchestration system 112 may include one or more server devices (or other similar computing devices) for executing orchestration services associated with performance testing. Example performance testing orchestration services may broadly include tasks associated with receiving a request to run a performance test on a computing resource, generating a performance testing environment, running a performance test in the performance testing environment, and destroying the performance testing after the performance test has completed. The orchestration services may utilize a state machine having a unique identifier to perform these tasks responsive to the request to help ensure a lifecycle of the computing resource is monitored or traced throughout, particularly when multiple performance tests for different computing resources are being run concurrently or in parallel. For example, the unique identifier may be associated with any resource created or deployed to enable subsequent identification and destruction. Additionally, one or more isolation mechanisms may be implemented by the state machine and/or one or more of the contributive systems 114 prior to resource creation to help ensure the performance testing is decoupled from the production.

The orchestration system 112 may support orchestration of a variety of different performance test types, including but not limited to, a load test, a stress test, and/or an endurance test. A load test may evaluate an application under pre-defined load levels against specified performance requirements for the application. A stress test may evaluate how an application performs beyond the limits of the specified performance requirements for the application. An endurance application may be a test that evaluates how an application performs running at a slightly lower load level than typical over a prolonged period of time.

The contributive systems 114 may include one or more server devices (or other similar computing devices) for facilitating the performance testing orchestrated by the orchestration system 112. For example, and as described in more detail with reference to FIG. 2, each of the contributive systems 114 may perform or facilitate the performance of one of the tasks orchestrated by the performance testing orchestration system 112. In some examples, one or more of the contributive systems 114 may be associated with different entities than the other contributive systems 114 and/or from the orchestration system 112.

The data storage systems 116 may include a server system or computer-readable memory such as a hard drive, flash drive, disk, etc. In some embodiments, the data storage system 116 includes and/or interacts with an application programming interface for exchanging data to other systems, e.g., one or more of the other components of the environment 100, such as the resource deployment system 110, the orchestration system 112, and/or one or more of the contributive systems 114. In some examples, one or more of the data storage systems 116 may be a sub-system or component of the orchestration system 112 (e.g., when the one or more data storage systems 116 are also provided by the provider rather than a third party).

The data storage system 116 may include and/or act as a repository or source for various types of data for the performance testing orchestration services. For example, the data storage system 116 may include a plurality of data stores, including a performance test results data store 118, an analytics data store 120, and/or a trained model data store 122, among other examples. The performance test results data store 118 may store results (e.g., pass, fail, score, etc.) associated with performance tests run on computing resources that are orchestrated by the orchestration system 112. The analytics data store 120 may persistently store performance metrics collected over a period of time for a plurality of computing resources when the computing resources are deployed in their production environments. The trained model data store 122 may store one or more trained models that are retrieved and executed by the orchestration system 112 to facilitate performance testing orchestration. For example, at least one trained model may predict performance metrics associated with a computing resource. The predicted performance metrics may be used to generate a script for the performance test to be run on the computing resource such that the resource is tested under similar load and other conditions expected for the computing resource during runtime in production.

The network 106 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 106 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The computing device 102 and one or more of the server-side systems 108 may be connected via the network 106, using one or more standard communication protocols. The computing device 102 and one or more of the server-side systems 108 may transmit and receive communications from each other across the network 106, as discussed in more detail below.

Although depicted as separate components in FIG. 1, it should be understood that a component or portion of a component in the system of exemplary environment 100 may, in some embodiments, be integrated with or incorporated into one or more other components. For example, the orchestration system 112 and/or one or more of the contributive systems 114 may be integrated with the resource deployment system 110 (e.g., to form a larger system of the provider) or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102 or one or more of the server-side systems 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
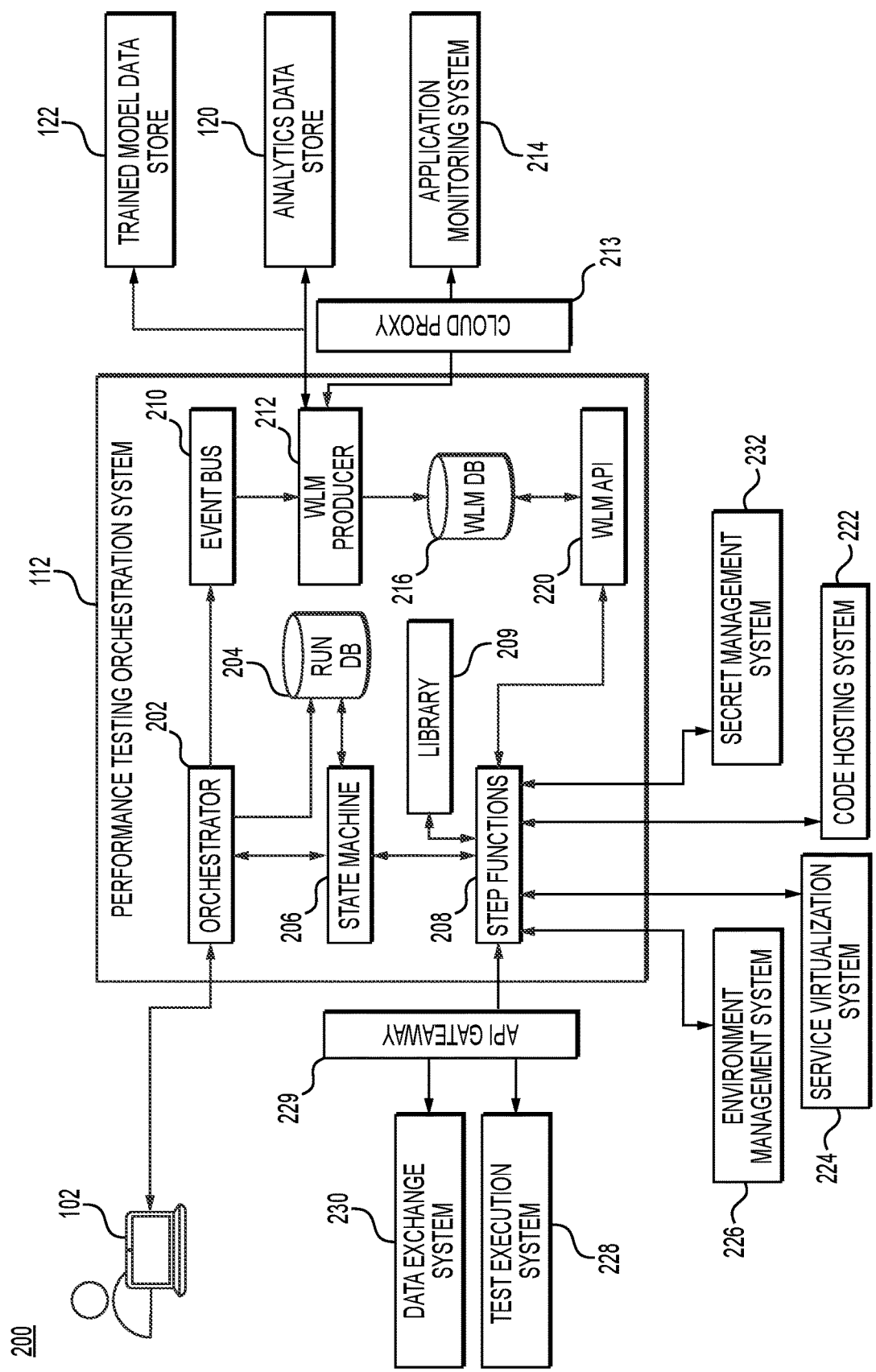
FIG. 2 depicts a system flow diagram for orchestrating performance testing for an application using a state machine, according to certain embodiments.

FIG. 2 depicts a system flow diagram 200 for orchestrating performance testing for cloud computing resources. The system of the system flow diagram 200 may include components of the environment 100 described above with reference to FIG. 1, such as the computing device 102, the orchestration system 112, and the contributive systems 114. The orchestration system 112 may include a plurality of components including an orchestrator 202, a run database (e.g., run DB) 204, a state machine 206 configured to execute a plurality of step functions 208, a library 209, an event bus 210, and a workload modeling system (WLM) including a WLM producer 212, a WLM database (e.g., WLM DB) 216, and a WLM application programming interface (API) 220. In some examples, the run database 204 and/or the WLM database 216 may alternatively be components of one or more of the data storage systems 116 separate from the orchestration system 112. The contributive systems 114 (FIG. 1) may include an application monitoring system 214, a code hosting system 222, a service virtualization system 224, an environment management system 226, a test execution system 228, a data exchange system 230, and/or a secret management system 232.

To provide an illustrative example, the orchestrator 202 (e.g., a user-facing component of the orchestration system 112) may receive, from the computing device 102, a request to run a performance test on a computing resource. For example, an application associated with the orchestration system 112 may be executing on the computing device 102, and the request may be initiated and sent from the computing device 102 to the orchestrator 202 via the application. The request may be associated with an adhoc or scheduled performance test. In other examples, the request may alternatively be received from the resource deployment system 110 (FIG. 1). For example, in response to receiving a new or modified computing resource to be deployed, the resource deployment system 110 may automatically send the request to the orchestrator 202 to initiate performance testing. The request may include information associated with the performance test to be run on the resource, including a type of performance test to be run (e.g., load test, stress test, or endurance test, among other examples). As one example, the resource may be an application on which a load test is to be run. The orchestrator 202 may provide the information from the request to the run database 204 for storage. The orchestrator 202 may also provide the information from the request to the state machine 206.

The state machine 206 may be assigned to the particular request such that the state machine 206 may be configured to monitor or trace the resource throughout its lifecycle associated with the performance testing. For example, the state machine 206 may execute the step functions 208 to cause (e.g., to provide instructions to) the contributive systems 114 to generate the performance test environment, run the performance test in the performance test environment, and destroy the performance test environment after the performance test is complete. To enable monitoring or tracing of the resource throughout the lifecycle, a unique identifier of the state machine 206 (e.g., a state machine identifier) may be used as a tag or marker, as described in detail below. By assigning the state machine 206 to the request and utilizing the unique identifier of the state machine 206 as a lifecycle tracking mechanism, the orchestration system 112 may be configured to orchestrate a plurality of performance testing requests using the plurality of state machines simultaneously, where each request is assigned to a different state machine.

Examples of the step functions 208 executed by the state machine 206 to orchestrate the performance testing are addressed in turn below. Continuing with the example where the resource is an application, the step functions 208 may include retrieval of code for each component of the application from the code hosting system 222. The code hosting system 222 may be configured to store the code in a first repository associated with the application. In some examples, the code may be stored in configuration files. In further examples, and as described in detail below, the configuration files may be copied and modified, using the library 209, in order to remove any information from the configuration files related to environments other than the performance testing environment, such as information related to the production environment, to decouple the performance testing from production. In such examples, a forked repository of the first repository may be generated on the code hosting system 222 to store the modified copy. The forked repository may be subsequently destroyed once the performance testing has completed. One non-limiting example code hosting system 222 may be GitHub.

The step functions 208 may also include causing a deployment of each of the components of the application in the performance testing environment by the environment management system 226. The environment management system 226 may be configured to create and destroy the performance testing environment based on instructions received from the state machine 206. For example, the state machine 206 may be configured to initiate tasks or jobs executed by the environment management system 226 to deploy each application component in the performance testing environment. Additionally, after the performance testing is complete, the state machine 206 may be configured to initiate tasks or jobs executed by the environment management system 226 to destroy each application component that was deployed. In some examples, the application components may be destroyed in a reverse order from the order in which they were deployed. One non-limiting example environment management system 226 may be Jenkins.

Another one of the step functions 208 may include causing deployment of one or more mock application programming interfaces (APIs) in the created performance testing environment by the service virtualization system 224. For example, the service virtualization system 224 may be configured to create and deploy the mock APIs based on instructions received from the state machine 206. The application may be enabled to communicate with the mock APIs as the performance test is run on the application in the performance testing environment to promote isolation from other environments, such as the production environment. One non-limiting exemplary service virtualization system 224 may be Mimeo.

A further one of the step functions 208 may include causing a performance test to be generated and run on the application in the performance testing environment by the test execution system 228. The test execution system 228 may support various different testing tools, including JMeter, K6, Wrk, and Gatling. For example, the state machine 206 may generate and provide a script to the test execution system 228 that is interpretable by at least one of the performance testing tools of test execution system 228. The state machine 206 may provide the script along with instructions for the test execution system 228 to generate and run a performance test in accordance with the script.

Upon completion of the performance test, the test execution system 228 may return results of the performance test to the orchestrator 202 via the state machine 206. Additionally or alternatively, the results of the performance test may be provided to the data exchange system 230 as part of one of the step functions 208 executed by the state machine 206. The data exchange system 230 may be configured to make the results accessible to one or more other systems associated with the provider, such as the resource deployment system 110. For example, the data exchange system 230 may be a single stream platform that receives data (e.g., structured data) and may store the data in a variety of formats tailored or customized to particular needs. As one illustrative example, the data exchange system 230 may be configured to store data in a first format for long-term storage, in a second format for short-term storage to enable analysis or query performance, and/or in a third format to support real-time streaming. Further, the data exchange system 230 may be configured to make such data available at a large scale (e.g., an enterprise scale). In some examples, the state machine 206 and test execution system 228 and/or data exchange system 230 may communicate via an API gateway 229.

To generate the script provided to the test execution system 228, the step functions 208 may further include receiving one or more application performance metrics associated with the application for use in generating a production-like script. In some examples, the type of application performance metrics used to generate the script may be based on a type of the performance test to be performed. Additionally, if the application is a new application that has not been previously deployed or only limited application performance metrics are available for an existing application, application performance metrics may be received for one or more existing applications that are similar to the new application for use in generating the script. A similar existing application may be an application having a related context to the new application, where the related context indicates that the application may experience similar traffic, load, etc. in production. In other examples, both the performance metrics associated with application and the one or more similar applications may be received and used to generate the script regardless of the amount of performance metrics available for a given application.

For example, the state machine 206 may call the WLM API 220 to receive the application performance metrics. If the application to be performance tested is an application that is known to the orchestration system 112 (e.g., is an existing application), the WLM API 220 may receive the application performance metrics from the WLM database 216 as the WLM database 216 may include previous or historic performance metrics associated with the existing application. For example, the WLM database 216 may be configured to receive and store application performance metrics for a plurality of applications that are dynamically generated by the WLM producer 212 based on data received from the application monitoring system 214. For example, the WLM producer 212 may request and/or otherwise receive (e.g., by scraping) a plurality of performance metric datasets for the plurality of applications from the application monitoring system 214 at predefined intervals (e.g., daily) via a cloud proxy 213, for example. As one illustrative example, the event bus 210 may invoke a run of a batch trigger at the predefined intervals. Invocation of the batch trigger may cause a grouping of application endpoints stored in the WLM database 216 into N batches of 100 (e.g., 100 application endpoints=1 batch of the N batches). Based on the groupings, the WLM producer 212 may perform batched runs for the groupings in parallel to scrape new performance metrics for the application endpoints in the respective grouping from the application monitoring system 214, and update the WLM database 216 accordingly. In some examples, the WLM producer 212 may retrieve, from the trained model data store 122, and execute a trained machine learning model to predict the application performance metrics.

If the application to be performance tested is an application that is not known to the orchestration system 112 (e.g., is a new application), the WLM database 216 has no previous or historical performance metrics for the application. Therefore, in such examples, the WLM API 220 may reach out directly to the WLM producer 212 to synchronously receive current production performance metrics data for the new application from the application monitoring system 214 via the WLM producer 212. The WLM API 220 may return the current production performance metrics data to the state machine 206 for executing one of the step functions 208 (e.g., for generating the script). Additionally, a new set of indices associated with the new application may be created in the WLM database 216 such that performance metrics for the new application may be collected from the application monitoring system 214 moving forward and stored in a new set of indices for use in subsequent performance testing of the application.

The application monitoring system 214 may monitor the plurality of applications as they are deployed in production to collect the performance metrics. Example performance metrics may include peak transactions per second (TPS), error rate, and/or response time (e.g., $95^{th}$ percentile response time).

In some examples, the WLM database 216 may be short-term storage for the performance metrics generated by the WLM producer 212. Therefore, the WLM producer 212 may also provide the application performance metrics to the analytics data store 120 for long-term storage to enable the use of the application performance metrics captured over a long period of time for use in training one or more machine learning models, for example, to predict application performance metrics, as described in detail below.

In further examples, when the state machine 206 interacts with one or more of the contributive systems 114, any passwords, passcodes, or other similar authentication identifiers associated with the interactions may be managed by the secret management system 232.

The system components and process flow illustrated and described with reference to the system flow diagram 200 of FIG. 2 is non-limiting and exemplary. Additional, fewer, or different system components and/or processes may be included. Additionally or alternatively, processes may be performed in a different arrangement or order.

Figure 3:
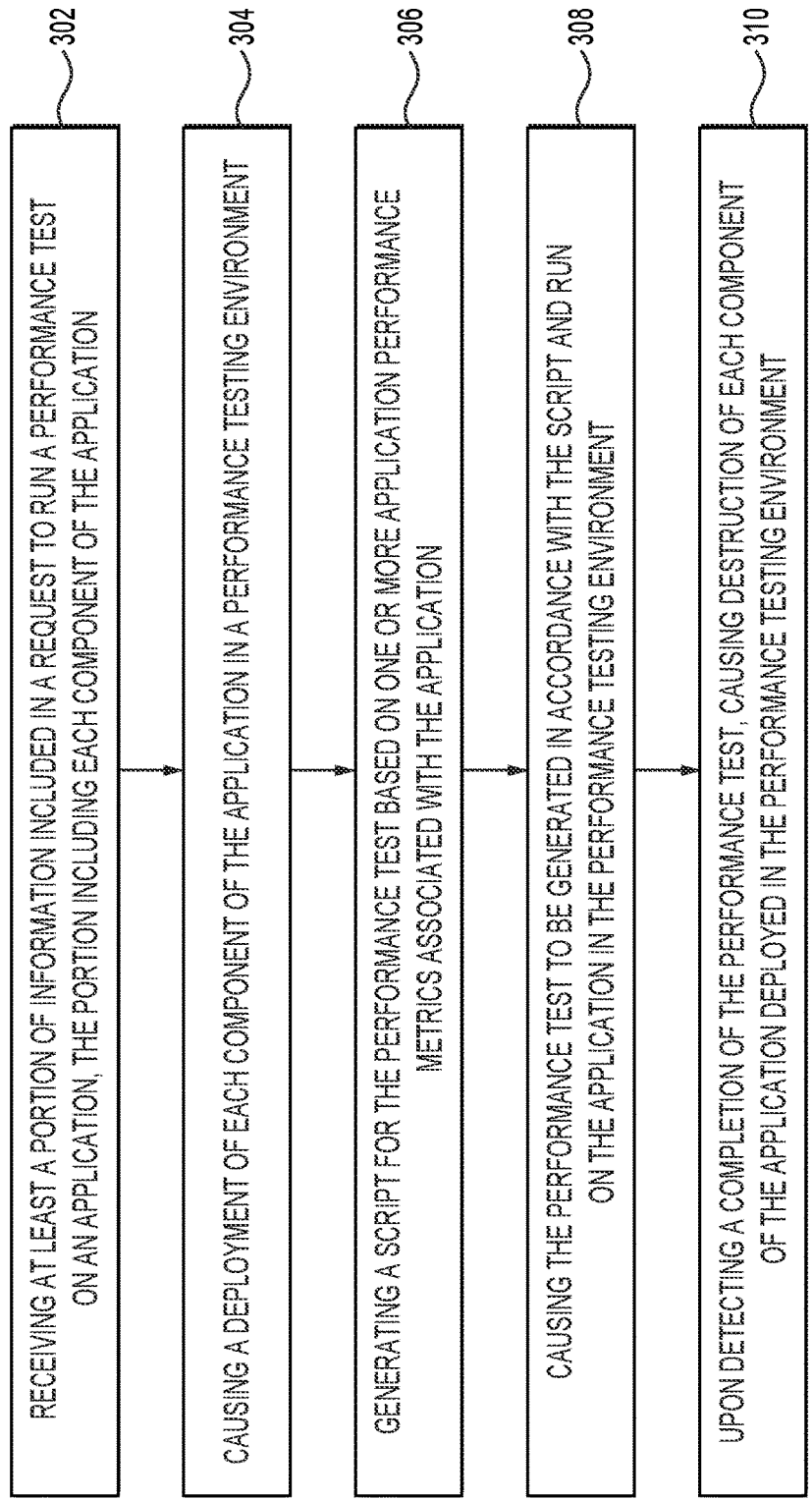
FIG. 3 depicts a flowchart of an exemplary process for orchestrating performance testing for an application using a state machine, according to certain embodiments.

FIG. 3 depicts a flowchart of an exemplary process 300 for orchestrating performance testing for an application using a state machine, such as the state machine 206, according to certain embodiments. In some examples, various steps of the process 300 may be performed by the state machine 206.

At step 302, the process 300 may include receiving at least a portion of information included in a request to run a performance test on an application. The portion of information may include each component of the application. In some examples, the portion of information may identify one or more configuration files that are stored in the code hosting system 222, where a block of the configuration files includes a suffix (or other portion of the files such as a prefix or middle portion) that indicates the application and/or each component thereof. Example components of the application may include one or more infrastructure components and/or one or more services. Infrastructure components may include a database, a virtual machine, or other similar infrastructure to support a service of the application. The services may be deployed on the infrastructure components. Additionally, the portion of information may include a type of performance test requested. Example performance test types may include a load test, a stress test, and/or an endurance test, among other examples.

To provide additional context, when the orchestration system 112 receives the request, the orchestration system 112 may assign the state machine 206 to orchestrate the performance test associated with the request. Additionally, the orchestration system 112 may generate a unique state machine identifier for the state machine 206. The state machine 206 may receive the state machine identifier along with at least the portion of the information including each component of the application received at step 302. Additionally, the information and the state machine identifier may be provided by the orchestration system 112 to the run database 204 described with reference to FIG. 2 for storage. In some examples, the orchestration system 112 may receive the request from the computing device 102 (e.g., via the application associated with the orchestration system 112 executing on the computing device 102). In other examples, the orchestration system 112 may automatically receive the request from the resource deployment system 110 in response to the resource deployment system 110 detecting the application is a new application or a modified version of an existing application to be deployed into a production environment.

At step 304, the process 300 may include causing a deployment of each component of the application in a performance testing environment. For example, the state machine 206 may be configured to interact with one or more of the contributive systems 114 to create the performance testing environment by causing a deployment of each of the infrastructure components and services of the application in the performance testing environment.

To cause the deployment, the state machine 206 may execute a subset of the step functions 208. For example, the state machine 206 may retrieve or download, from the code hosting system 222, one or more configuration files for each of the infrastructure components and the services of the application. In some examples, the configuration files may be identified from the portion of the information provided as part of the request. Each configuration file may be retrieved or downloaded from the first repository of the code hosting system 222 associated with the application.

In some examples, a scanning tool configured to scan the code within each of the configuration files may be used in conjunction with the library 209 to perform one or more checks. A first check may include scanning the code of a given configuration file to determine whether the configuration file includes any information related to environments other than the performance testing environment (e.g., any non-testing environment information). The library may define or describe various types of environments, including the production environment and one or more non-production environments, such as the performance testing environment. For example, the library 209 may define that any production environment-related information is prefixed with "prod" in the configuration file. Therefore, the scanning tool may scan the code for the information that is prefixed with "prod" (e.g., perform a find for "prod"). If any non-testing environment information is identified based on the scan, a copy of the configuration file may be generated, and the copy may be modified. For example, the identified non-testing environment information may be removed and/or replaced to decouple the performance testing from other environments, such as the production environment. A second check may include scanning the code of the configuration file to confirm the suffix that was included in the block of the configuration file provided as part of the request is present in the retrieved or downloaded configuration file.

Additionally, when one or more of the configuration files are modified, a forked repository of the first repository may be generated on the code hosting system 222, and the modified copy of the configuration file may be stored in the forked repository. The forked repository may be associated with the state machine identifier of the state machine 206. The forked repository may be generated to prevent any changes from being made to the configuration files stored in the first repository (e.g., to preserve the code), and the association of the forked repository with the state machine identifier may enable identification of the forked repository for destruction upon completion of the performance testing, described in detail below.

Based on the configuration file and/or modified configuration file, the state machine 206 may initiate execution of a set of one or more tasks or jobs by the environment management system 226 to deploy each of the infrastructure components and the services of the application. As described in more detail with reference to FIG. 4, the infrastructure components and the services may be deployed in a first order. For example, each infrastructure component may be deployed followed by each service given the dependencies of the services on the infrastructure components. Each of the tasks or jobs executed by the environment management system 226 may be associated with the state machine identifier such that the deployment of each of the infrastructure components and services is associated with the state machine identifier. For example, the state machine identifier may be included in the name or title of the task or job. Such association may be useful when destroying each of the infrastructure components and services deployed (e.g., to enable identification of each of the tasks based on the state machine identifier for reversal).

In addition to the deployment of the infrastructure components and the services, the state machine 206 may also be configured to cause deployment of the mock APIs in the performance testing environment for the application to communicate with as the performance test is run on the application in the performance testing environment. The mock APIs may be deployed by the service virtualization system 224, as described above with reference to FIG. 2. Each mock API may be associated with the state machine identifier to enable identification of the mock API for destruction upon completion of the performance testing, described in detail below. In some examples, the mock APIs may be automatically determined based on information provided by a user as part of a request, such as an application name known by the data exchange system 230, for example. The data exchange system 230 may be queried using the application name to identify the mock APIs. In other examples, the user may provide a list of the mock APIs as part of the request. Additionally, the performance testing environment created may be tested or probed prior to running the performance test on the application.

At step 306, the process 300 may include generating a script for the performance test based on one or more application performance metrics associated with the application. The application performance metrics may be used in order to generate a test, via the script, that simulates the application in production. The type of application performance metrics used to generate the script may be based on a type of the performance test to be performed. For example, different application performance metrics may be utilized for a load test versus a stress test versus an endurance test, etc. The script may be associated with the state machine identifier.

As discussed in greater detail with reference to FIG. 2, the application performance metrics may be received from the WLM database 216 via the WLM API 220. The WLM producer 212 may receive (e.g., scrape) a plurality of performance metric datasets for a plurality of applications collected by the application monitoring system 214. The application performance metrics used to generate the script may be dynamically generated by the WLM producer 212 based on a subset of the performance metric datasets. For example, the application performance metrics may be generated based on a first plurality of performance metrics datasets for the application collected by the application monitoring system 214. Additionally or alternatively, the application performance metrics may be generated based on a second plurality of datasets of performance metrics for another application having a related context to the application collected by the application monitoring system 214. The related context may indicate that the other application may experience similar traffic, load, etc. in production to the application. In some examples, the WLM producer 212 of the WLM system may execute a machine learning model that is trained to predict application performance metrics for a future time frame for use in generating a script for a performance test to simulate an application in production in the future time frame, as described in detail with reference to FIG. 5 below.

In other examples, the user may provide a uniform resource locator (URL) to an existing script (e.g., a script generated by the user or another system or device). The state machine 206 may retrieve the script via the URL for provision to the test execution system 228, as described at step 308.

At step 308, the process 300 may include causing the performance test to be generated in accordance with the script and run on the application in the performance testing environment. For example, the state machine 206 may provide the script generated at step 306 along with or as part of instructions to the test execution system 228. Responsive to the instructions, the test execution system 228 may generate the performance test based on the script, associate the performance test with the state machine identifier, and run the performance test on the application in the performance testing environment created by the environment management system 226.

In other examples, aspects of the performance testing (e.g., the script) may be generated by a third party. For example, the orchestration system 112 may cause the performance testing environment to be created by the environment management system 226, and the third party may run their system on the application in the performance testing environment. As one non-limiting example, the third party system may provide chaos testing based on production workloads that, when run on the application, yields scores.

At step 310, the process 300 may include, upon detecting a completion of the performance test, causing destruction of each component of the application deployed in the performance testing environment. The destruction may be performed by the environment management system 226. As previously discussed, the infrastructure components and the services of the application may be deployed by the environment management system 226 in the performance testing environment in a first order. At step 310, the infrastructure components and the services of the application may be destroyed by the environment management system 226 in a second order that is a reverse order of the first order. Destruction in the second, reverse order abides to the dependencies of the services to the infrastructure components, which enables a clean destruction of the application in the performance testing environment to prevent loss of data and/or avoid potential errors.

As described in more detail below with reference to FIG. 4, the destruction may include verifying that each of the infrastructure components and services is in fact deployed. Once verified, the state machine 206 may initiate execution of a set of one or more tasks by the environment management system 226 to destroy each of the infrastructure components and services of the application that was deployed in association with the state machine identifier. Additionally, the state machine 206 may cause destruction of the mock APIs associated with the state machine identifier, and/or any forked repository associated with the state machine identifier that was generated on the code hosting system 222 to store modified configuration files.

Further, upon detecting the completion of the performance test, a result of the performance test may be received from the test execution system 228. In some examples, the result of the performance test (e.g., pass or fail) may be based on a current production workload for the application. For example, the application may pass if the application operated at least as good as the application is operating in its current state in production within a certain confidence interval. The result may at least provide an indication of whether the application passed or failed the performance test. In some examples, the result may also include one or more scores generated as part of the performance testing and/or if the application failed the performance test, reasons for the failure. The result may be stored in the performance test results data store 118.

Additionally, in some examples, when the request is received from the computing device 102, the result may be provided, via the orchestrator 202, to the computing device 102 as a notification. In other examples, when the request is automatically received from the resource deployment system 110, the result may be provided, via the orchestrator 202, to the resource deployment system 110. The resource deployment system 110 may be configured to automatically deploy the application into the production environment when the result indicates the application passed the performance test, and prevent the application from deploying into the production environment when the result indicates the application failed the performance test. If the application is prevented from deploying, the resource deployment system 110 may generate and send a notification to the computing device 102 for display (e.g., via an application associated with the resource deployment system 110) to alert the user of the failure.

The above process 300 describes orchestration of performance testing in response to a single request received to run a performance test on the application. In some examples, the orchestration system 112 may receive a plurality of requests from different users to run performance tests on different applications, and the orchestration of performance testing for each of the different applications, including environment creation, performance testing, and environment destruction, may be performed concurrently or in parallel. For example, by assigning a separate state machine to each request and generating a unique state machine identifier for each state machine that is associated with each resource generated or deployed throughout the orchestration, performance testing for each of the different applications may remain isolated, such that one does not affect another as resources are being deployed, tests are being run, and/or resources are being destroyed.

Accordingly, certain embodiments may perform application performance testing orchestration using state machines. The process 300 described above is provided merely as an example, and may include additional, fewer, different, or differently arranged steps than depicted in FIG. 3.

Figure 4:
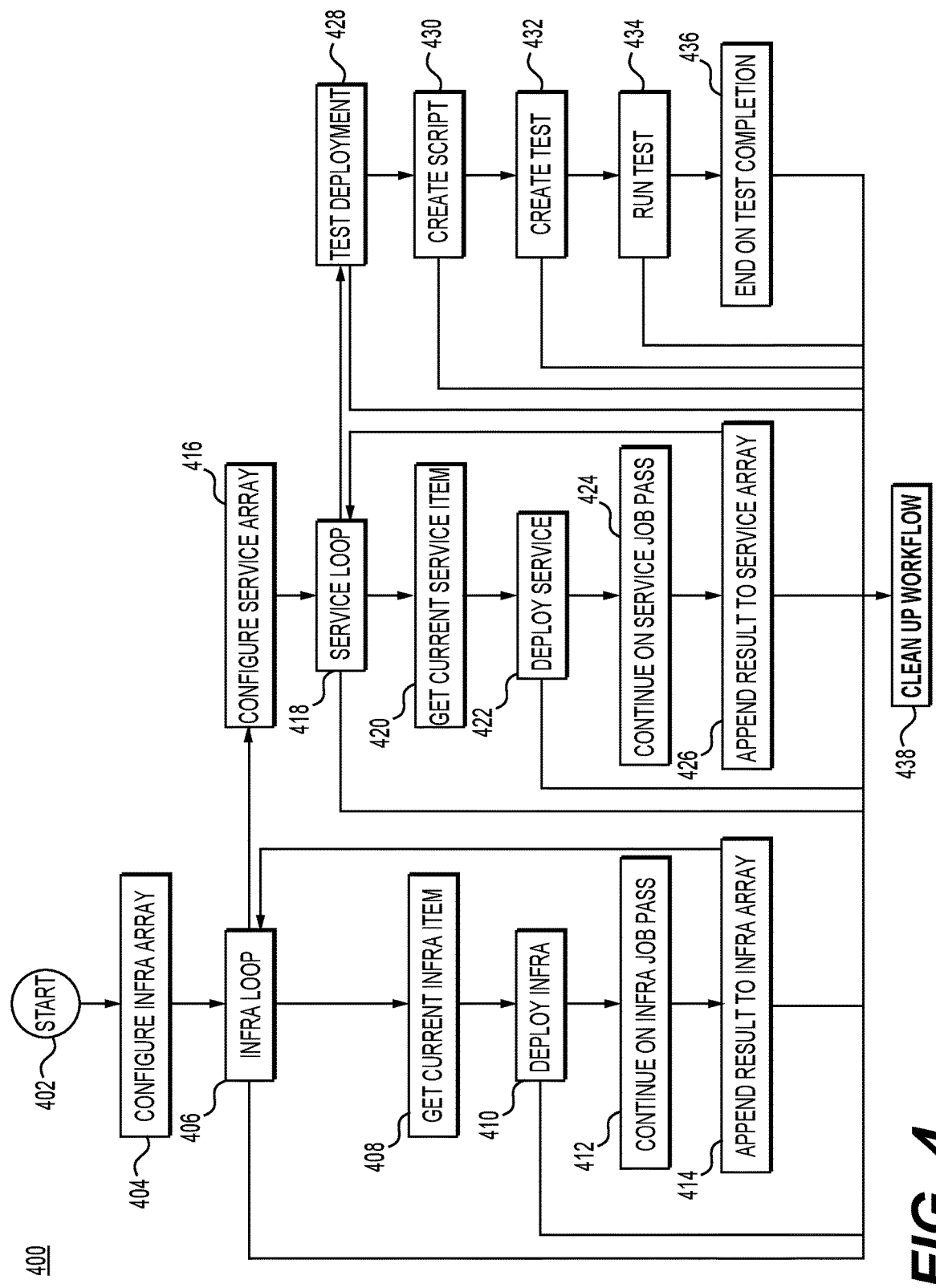
FIG. 4 depicts an example state machine diagram.
Figure 4:
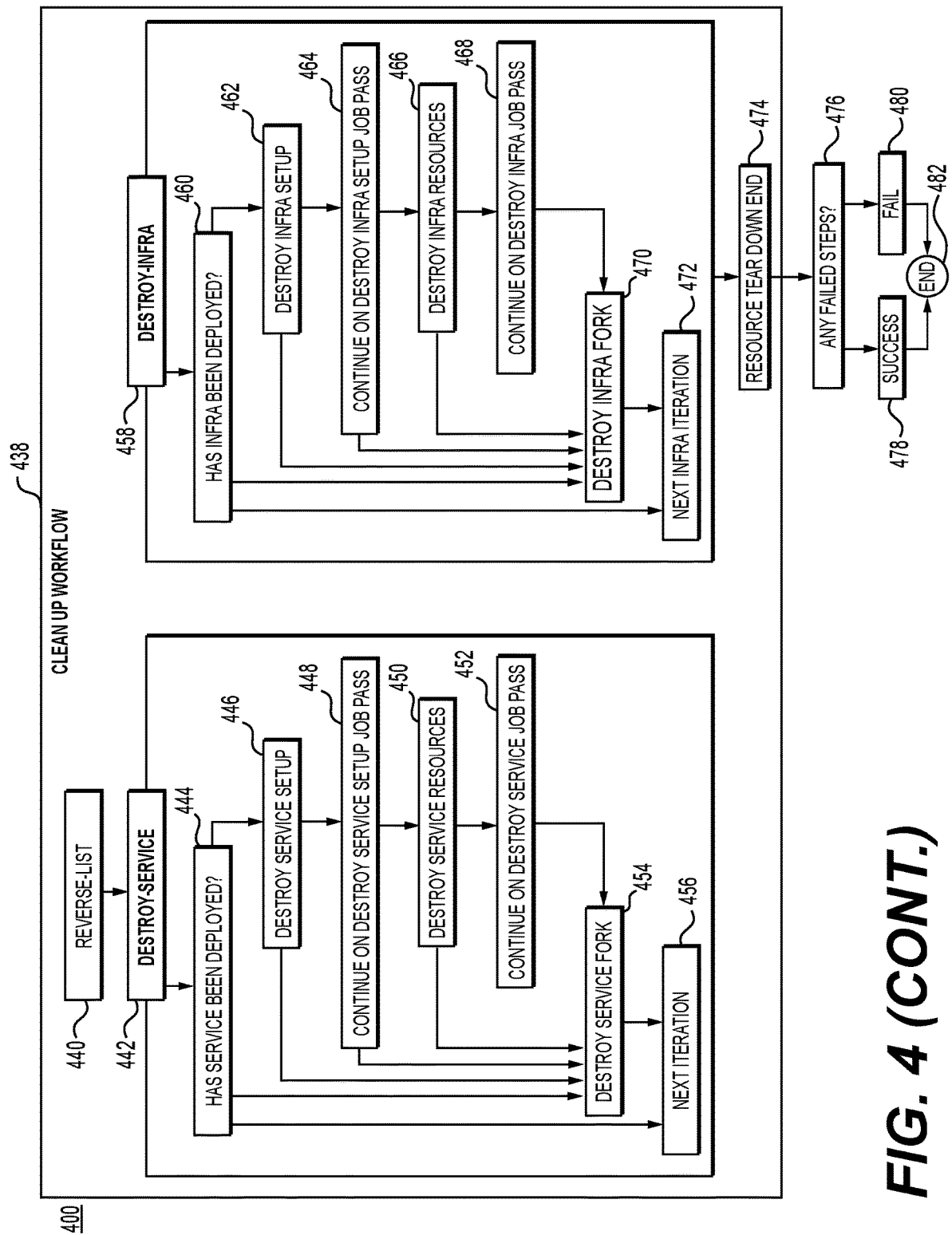

FIG. 4 depicts an example state machine diagram 400 depicting various states 402-474 of the state machine 206 as functions (e.g., the step functions 208) are executed by the state machine 206 to orchestrate the application performance testing via the process 300. The orchestration may include three phases: a first environment creation phase, a second performance testing phase, and a third environment destruction phase.

The receipt of the portion of the information including each component of the application at the step 302 of process 300 (along with the state machine identifier) may place the state machine 206 in an initiation or start state 402. In the first environment creation phase, the state machine 206 may create a performance testing environment by causing a deployment of each of the one or more infrastructure components and the one or more services of the application in the performance testing environment in a first order.

For example, the state machine 206 may use the portion of the information to configure an infrastructure array ("Configure Infra Array") at state 404 that defines each of the one or more infrastructure components of the application. The state machine 206 then enters into an infrastructure loop ("Infra Loop") at state 406 that continuously cycles through states 408-414 per infrastructure component until each infrastructure component defined in the infrastructure array is deployed in the performance testing environment.

For example, at state 408 ("get Current Infra Item"), the state machine 206 may receive one or more configuration files for a first infrastructure component of the application from the first repository of the code hosting system 222. At state 410 ("Deploy Infra"), the state machine 206 may perform the first and/or second checks on the configuration files (e.g., scanning the code of the configuration file to identify any non-testing environment information and/or confirm the suffix or other portion of file included in the request is included in the block of the configuration file) and modify the configuration files, if necessary, as described in detail above with reference to FIG. 3. Additionally, the state machine 206 may interact with (e.g., provide instructions to) the environment management system 226 to initiate a task performed by the environment management system 226 to deploy the first infrastructure component based on the configuration file and/or modified configuration file. The instructions provided may also include the state machine identifier, and the first infrastructure component deployed by the environment management system 226 may be associated with the state machine identifier. For example, the state machine identifier may be included in the name or title of the task.

At state 412 ("Continue On Infra Job Pass"), the state machine 206 may wait for the task to deploy the first infrastructure component to be completed by the environment management system 226. In some examples, the task may take about 30 minutes to one hour to complete. Once the task is completed, a result indicating such completion may be received from the environment management system 226, and the state machine 206 may transition to state 414 ("Append Result To Infra Array"). At state 414, the state machine 206 may update the infrastructure array to indicate the first infrastructure component is now deployed based on the result received. The state machine 206 may then transition back to state 406, and repeat states 408-414 for a second infrastructure component included in the infrastructure array, and so on until each infrastructure component has been deployed by the environment management system 226.

Once each infrastructure component has been deployed by the environment management system 226, the state machine 206 may transition out of the infrastructure loop to state 416. At state 416, the state machine 206 may use the portion of the information to configure a service array ("Configure Service Array") that defines each of the one or more services of the application. The services may include code for deploying the application onto the deployed infrastructure components. The state machine 206 then enters into service loop ("Service Loop") at state 418 that continuously cycles through states 420-426 per service until each service defined in the service array is deployed in the performance testing environment.

For example, at state 420 ("get Current Service Item"), the state machine 206 may receive one or more configuration files for a first service of the application from the first repository of the code hosting system 222. At state 422 ("Deploy Service"), the state machine 206 may perform the first and/or second checks on the configuration files (e.g., scanning the code of the configuration file to identify any non-testing environment information and/or confirm the suffix or other portion of file included in the request is included in the block of the configuration file) and modify the configuration files, if necessary, as described in detail above with reference to FIG. 3. Additionally, the state machine 206 may interact with (e.g., provide instructions to) the environment management system 226 to initiate a task performed by the environment management system 226 to deploy the first service based on the configuration file and/or modified configuration file. The instructions provided may also include the state machine identifier, and the first service deployed by the environment management system 226 may be associated with the state machine identifier. For example, the state machine identifier may be included in the name or title of the task.

At state 424 ("Continue On Service Job Pass"), the state machine 206 may wait for the task to deploy the first service to be completed by the environment management system 226. In some examples, the task may take about 30 minutes to one hour to complete. Once the task is completed, a result indicating such completion may be received from the environment management system 226, and the state machine 206 may transition to state 426 ("Append Result To Service Array"). At state 426, the state machine 206 may update the service array to indicate the first service is now deployed based on the result received. The state machine 206 may then transition back to state 418, and repeat states 420-426 for a second service included in the service array, and so on until each service has been deployed by the environment management system 226.

Although not shown in FIG. 4, the state machine 206 may also be configured to cause deployment of the mock APIs in the performance testing environment by the service virtualization system 224. For example, the service virtualization system 224 may be configured to create and deploy the mock APIs based on instructions received from the state machine 206. The instructions may include the state machine identifier such that the mock APIs are associated with the state machine identifier. The application may be enabled to communicate with the mock APIs as the performance test is run on the application in the performance testing environment to promote isolation from other environments.

Once each of the infrastructure components and services (and mock APIs) has been deployed to create the performance testing environment, the state machine 206 may probe or test the performance testing environment ("Test Deployment") to ensure the performance testing environment is ready to run a performance test at state 428. After the performance testing environment is probed or tested, the orchestration process may transition from the first environment creation phase to the second performance testing phase.

In the second performance testing phase, the state machine 206 may be configured to generate a script for the performance test ("Create Script") at state 430. For example, the state machine 206 may call the WLM API 220 to receive application performance metrics associated with the application (and/or a similar application) from the WLM database 216, as described in detail with reference to FIG. 2. The script may be generated based on the application performance metrics in order to generate a test that simulates the application in production. For example, if the application has high traffic in production, the script is generated such that the test will include a load model having high traffic. The script may be associated with the state machine identifier. For example, a file for the script may include the state machine identifier in the title or name.

After the script is generated, the state machine 206 may cause a performance test to be generated in accordance with the script ("Create Test") at state 432. For example, the state machine 206 may provide the script to the test execution system 228, along with instructions for the test execution system 228 to generate a performance test in accordance with the script. The test execution system 228 may generate the performance test based on the instructions. The performance test may be associated with the state machine identifier. Upon generation of the performance test, the state machine 206 may cause the performance test to be run on the application in the performance testing environment ("Run Test") at state 434. For example, the state machine 206 may provide instructions for the test execution system 228 to run the performance test in the performance testing environment created or deployed by the environment management system 226.

Once the performance test has completed, the state machine 206 may receive an indication of the completion and/or performance test results from the test execution system 228, and end the second performance testing phase at state 436 ("End On Test Completion"). The state machine 206 may then transition to the third environment destruction phase and implement a clean-up workflow 438 in order to destroy every resource that had been created for the performance testing. In other examples, if any one of previous states 406, 410, 414, 418, 422, 426, 428, 430, 432, or 434 associated with the first environment creation phase and/or second performance testing phase fail, the state machine 206 may automatically transition to the clean-up workflow 438 in order to destroy any resource that had been created for the performance testing up to the point of failure.

As described above with respect to the first environment creation phase, each of the infrastructure components may be deployed prior to the service components in a first order given that the service components may depend on the infrastructure components to be able to deploy and/or function. In the clean-up workflow, each of the infrastructure components and services may be destroyed in a second order that is a reverse order of the first (e.g., destroyed in a reverse order of how deployed). Therefore, each of the services may be destroyed, followed by each of the infrastructure components. By destroying in the reverse order, the dependencies of the services to the infrastructure components may be abided to, which enables a clean destruction of the application in the performance testing environment to prevent loss of data and/or avoid potential errors. To facilitate the reverse order destruction, at state 440, the state machine 206 may obtain a reverse list ("Reverse-List") that includes the reverse order in which the services and the infrastructure components were deployed. For example, the state machine 206 may store a list of the services and the infrastructure components in the order in which they were deployed (e.g., in the first order). The state machine 206 may obtain the reverse list by traversing the stored list in a reverse order (e.g., by self-referencing the states of the state machine 206).

Using the reverse list, the state machine 206 may cause destruction of the services of the application deployed in the performance testing environment ("Destroy-Service") at state 442. The state 442 may be comprised of a loop that continuously cycles through one or more of states 444-456 per service until each service deployed in the performance testing environment is destroyed.

For example, for each service, the state machine 206 may determine whether the respective service is deployed in the performance testing environment at state 444. If the service is determined to have been deployed at state 444, the state machine 206 may transition to state 446 ("Destroy Service Setup"), where the state machine 206 may interact with (e.g., provide instructions to) the environment management system 226 to initiate a first task performed by the environment management system 226 to create a destroy pipeline that is capable of destroying resources, such as resources of the service. At state 448 ("Continue On Destroy Service Setup Job Pass"), the state machine 206 may wait for the first task to be completed by the environment management system 226. Once the first task is completed to create the destroy pipeline, the state machine 206 may interact with (e.g., provide instructions to) the environment management system 226 to initiate a second task performed by the environment management system 226 to destroy resources of the service ("Destroy Service Resources") at state 450 by running the destroy pipeline. At state 452 ("Continue On Destroy Service Job Pass"), the state machine 206 may wait for the second task to be completed by the environment management system 226. The instructions provided by the state machine 206 to the environment management system 226 at states 446 and 450 may include the state machine identifier such that the environment management system 226 may utilize the state machine identifier to identify and/or confirm the setup and/or resources of the service to be destroyed.

In response to a completion of any one of the states 446-452, the state machine 206 may transition to state 454, where the state machine 206 may be configured to cause destruction of a forked repository generated on the code hosting system 222 to store one or more modified configuration files that include code for the service ("Destroy Service Fork"). To cause the destruction of the forked repository, the state machine 206 may provide instructions to the code hosting system 222 that include the state machine identifier such that the code hosting system 222 may utilize the state machine identifier to identify the forked repository associated with the identifier for destruction. After the forked repository is destroyed, state machine 206 may be configured to move to a next service component of the application to destroy at state 456 ("Next iteration").

In other examples, if the service is determined not to have been deployed at state 444, the state machine 206 may transition to state 454 to destroy the forked repository generated ("Destroy Service Fork"), and move to a next service component of the application to destroy at state 456 ("Next iteration"). Alternatively, if no forked repository was generated, then the state machine 206 may transition directly to state 456.

Each service of the application deployed may be destroyed as described above to complete state 442. Then, using the reverse list, the state machine 206 may next cause destruction of the infrastructure components of the application deployed in the performance testing environment ("Destroy-Infra") at state 458. The state 458 may be comprised of a loop that continuously cycles through one or more of states 460-472 per infrastructure component until each infrastructure component deployed in the performance testing environment is destroyed.

For example, for each infrastructure component, the state machine 206 may determine whether the respective infrastructure component has been deployed in the performance testing environment at state 460. If the infrastructure component is determined to have been deployed at state 460, the state machine 206 may transition to state 462 ("Destroy Infrastructure Setup"), where the state machine 206 may interact with (e.g., provide instructions to) the environment management system 226 to initiate a first task performed by the environment management system 226 to create a destroy pipeline that is capable of destroying resources, such as resources of the infrastructure component. At state 464 ("Continue On Destroy Infra Setup Job Pass"), the state machine 206 may wait for the first task to be completed by the environment management system 226. Once the first task is completed to create the destroy pipeline, the state machine 206 may interact with (e.g., provide instructions to) the environment management system 226 to initiate a second task performed by the environment management system 226 to destroy resources of the infrastructure component ("Destroy Infra Resources") at state 466 by running the destroy pipeline. At state 468 ("Continue On Destroy Infra Job Pass"), the state machine 206 may wait for the second task to be completed by the environment management system 226. The instructions provided by the state machine 206 to the environment management system 226 at states 462 and 466 may include the state machine identifier such that the environment management system 226 may utilize the state machine identifier to identify and/or confirm the setup and/or resources of the infrastructure component to be destroyed.

In response to a completion of any one of the states 462-468, the state machine 206 may transition to state 470, where the state machine 206 may be configured to cause destruction of a forked repository generated on the code hosting system 222 to store modified configuration files that include code for the infrastructure component ("Destroy Infra Fork"). To cause the destruction of the forked repository, the state machine 206 may provide instructions to the code hosting system 222 that include the state machine identifier such that the code hosting system 222 may utilize the state machine identifier to identify the forked repository associated with the identifier for destruction. After the forked repository is destroyed, state machine 206 may be configured to move to a next infrastructure component of the application to destroy at state 472 ("Next iteration").

In other examples, if the infrastructure component is determined not to have been deployed at state 460, the state machine 206 may transition to state 470 to destroy the forked repository generated ("Destroy Infra Fork"), and move to a next infrastructure component of the application to destroy at state 472 ("Next iteration"). Alternatively, if no forked repository was generated, then the state machine 206 may transition directly to state 472.

Once each infrastructure component of the application is destroyed as described above to complete state 458, the resource tear down may end ("Resource Tear Down End") at state 474. Additionally, the clean-up workflow 438 may terminate. Further, although not shown in FIG. 4, the state machine 206 may also be configured to cause destruction of the mock APIs in the performance testing environment. In some examples, the mock APIs may be destroyed prior to both the services and the infrastructure components. For example, the state machine 206 may provide instructions, including the state machine identifier, to the service virtualization system 224 to destroy the mock APIs that are associated with the state machine identifier.

At state 476, the state machine 206 may determine or identify whether any functions (e.g., the step functions 208) performed by the state machine 206 throughout the various states 402-474 failed. If no failed steps are determined or identified, an indication of success may be provided at state 478. Alternatively, if any failed steps are determined or identified, an indication of failure may be provided at state 480. The provision of the indication of success or failure may place the state machine 206 in a final end state 482.

Figure 5:
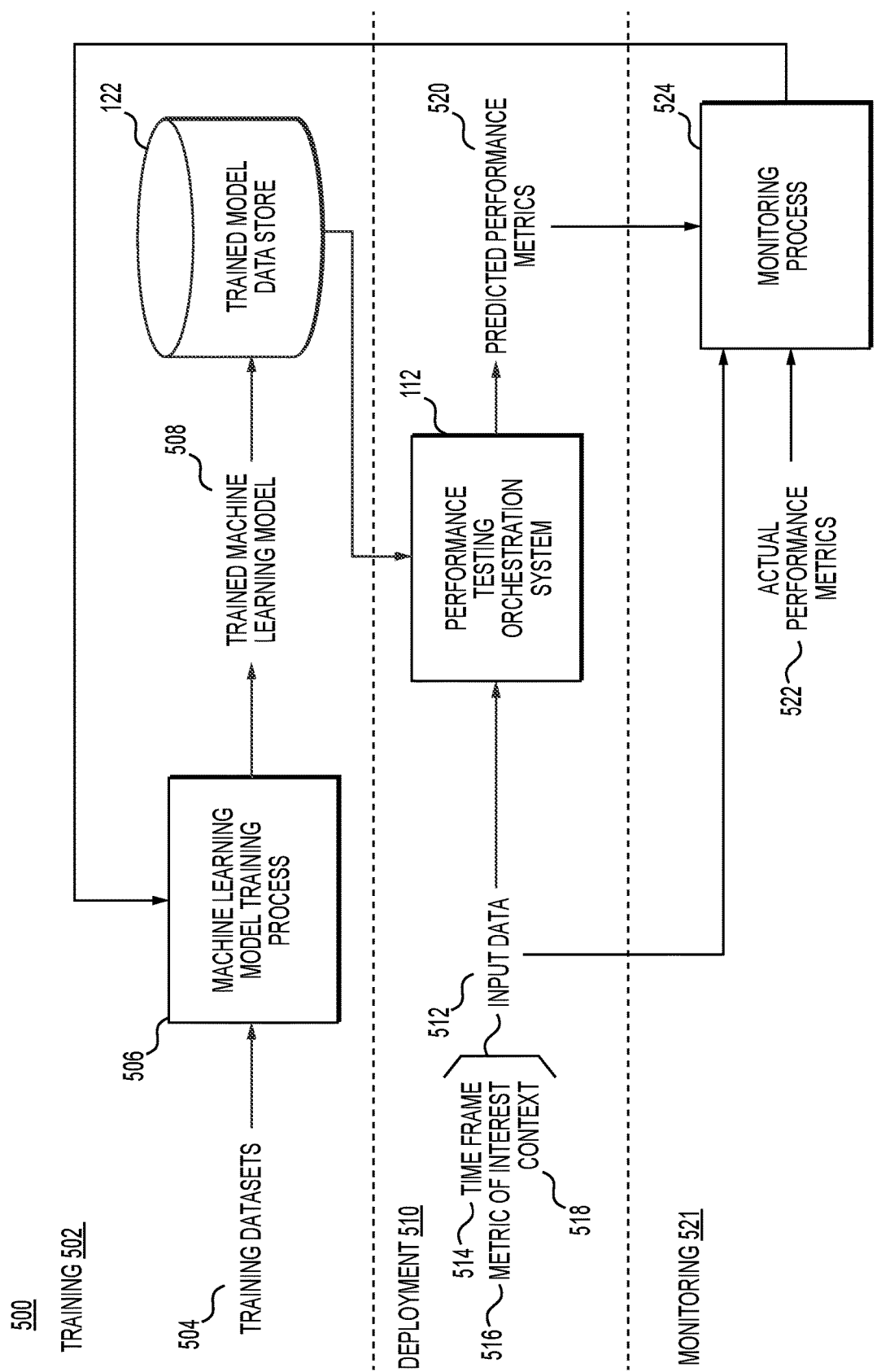
FIG. 5 depicts a block diagram of an exemplary process for training and using a machine learning model to predict application performance metrics, according to certain embodiments.

FIG. 5 depicts a block diagram of an exemplary process 500 for training and using a machine learning system to predict application performance metrics, according to certain embodiments. The machine learning system may include a machine learning model configured to predict application performance metrics for a specific future time frame. In some embodiments, the orchestration system 112 may one or more of generate, store, train, or use the machine learning model. The orchestration system 112 may include the machine learning model and/or instructions associated with the machine learning model, e.g., instructions for generating a machine learning model, training the machine learning model, using the machine learning model, etc. In other embodiments, a system or device other than the orchestration system 112 may be used to generate and/or train the machine learning model. For example, such a system may include instructions for generating the machine learning model and the training data, and/or instructions for training the machine learning model. A resulting trained machine learning model may then be provided to the orchestration system 112 for use.

As depicted in FIG. 5, in some examples, the process 500 may include a training phase 502, a deployment phase 510, and a monitoring phase 521. In the training phase 502, at step 506, the process 500 may include receiving and processing a plurality of training datasets 504 to generate (e.g., build) a trained machine learning model 508 for predicting application performance metrics.

Each training dataset of the plurality of training datasets 504 may be associated with an application and/or a user (e.g., a developer) associated with the application. An exemplary training dataset of the plurality of training datasets 504 may include a past time frame, a metric type that was collected during the past time frame for the application, a context of the application associated with the metric, and historical application performance metrics for the application (e.g., collected prior to the date of the past time frame). The exemplary training set may also include a corresponding label that includes actual performance metrics of the metric type for the given context of the application in the past time frame. The training datasets 504 may be generated, received, or otherwise obtained from internal and/or external resources. For example, an identifier of an account where the actual performance metrics are stored (e.g., within the analytics data store 120) may be used to access and/or collect the data to curate the training datasets 504.

Generally, a model includes a set of variables, e.g., nodes, neurons, filters, etc., that are tuned, e.g., weighted or biased, to different values via the application of the training datasets 504. In some examples, the training process at step 506 may employ supervised, unsupervised, semi-supervised, and/or reinforcement learning processes to train the model (e.g., to result in trained machine learning model 508). In some embodiments, a portion of the training datasets 504 may be withheld during training and/or used to validate the trained machine learning model 508.

When supervised learning processes are employed, the labels corresponding to the training datasets 504 described above may facilitate the learning process by providing a ground truth. Training may proceed by feeding a training dataset 504, including a past time frame, metric type, context, and historical application performance metrics for the application (e.g., a sample) from the training datasets 504 into the model, the model having variables set at initialized values, e.g., at random, based on Gaussian noise, a pre-trained model, or the like. The model may output predicted application performance metrics for the sample. The output may be compared with the corresponding label or score (e.g., the ground truth) indicating the actual application performance metrics to determine an error, which may then be back-propagated through the model to adjust the values of the variables. This may be repeated for a plurality of samples at least until a determined loss or error is below a predefined threshold. In some examples, some of the training datasets 504 may be withheld and used to further validate or test the trained machine learning model 508.

For unsupervised learning processes, the training datasets 504 may not include pre-assigned labels or scores to aid the learning process. Rather, unsupervised learning processes may include clustering, classification, or the like to identify naturally occurring patterns in the training datasets 504. K-means clustering or K-Nearest Neighbors may also be used, which may be supervised or unsupervised. Combinations of K-Nearest Neighbors and an unsupervised cluster technique may also be used. For semi-supervised learning, a combination of training datasets 504 with pre-assigned labels or scores and training datasets 504 without pre-assigned labels or scores may be used to train the model.

When reinforcement learning is employed, an agent (e.g., an algorithm) may be trained to make a decision regarding the application performance metrics for the sample from the training datasets 504 through trial and error. For example, upon making a decision, the agent may then receive feedback (e.g., a positive reward if the predicted application performance metrics was within a threshold value of the actual application performance metrics), adjust its next decision to maximize the reward, and repeat until a loss function is optimized.

In some examples, a separate machine learning model 508 may be trained for each application. In other examples, the trained machine learning model 508 may be common across applications.

Once trained, the trained machine learning model 508 may be stored (e.g., in the trained model data store 122) and subsequently applied by the orchestration system 112 during the deployment phase 510. For example, during the deployment phase 510, the trained machine learning model 508 executed by the orchestration system 112 may receive input data 512. The input data 512 may include a time frame 514, a metric of interest 516, and a context 518 provided by a user (e.g., as part of the request received by the orchestration system 112). As one illustrative example, the input data 512 may include July 3-5 holiday weekend with an error rate being of interest for mobile logins to the application. The machine learning model 508 may provide, as output data, predicted performance metrics 520. In some examples, the predicted performance metrics 520 may output as a curve demonstrating production over the time frame. In some examples, the curve may show different granularity within the time frame (e.g., per date, per hour, per minute). The predicted performance metrics 520 may then be retrieved and used by the state machine 206 to generate a script for a performance test that will more accurately simulate use of the application in production in the given time frame (not shown in FIG. 5).

During the monitoring phase 521, feedback associated with the output data of the trained machine learning model 508 may be received when the trained machine learning system is deployed. For example, actual performance metrics 522 of the application when deployed in production in the given time frame may be collected by the orchestration system 112 via the application monitoring system 214 during the monitoring phase 521. During a monitoring process 524, the actual performance metrics 522 may be analyzed along with the predicted performance metrics 520 and the input data 512 to determine an accuracy of the trained machine learning model 508. In some examples, based on the analysis, the process 500 may return to the training phase 502, where at step 506 values of one or more variables of the model may be adjusted to improve the accuracy of the trained machine learning model 508. For example, the actual performance metrics 522 may be used as a label to create a new training dataset 504 for use in retraining the trained machine learning model 508. In some examples, the trained machine learning model 508 may be retrained after a predefined number of new training datasets have been received.

The exemplary process 500 described above is provided merely as an example, and may include additional, fewer, different, or differently arranged aspects than depicted in FIG. 5.

Figure 6:
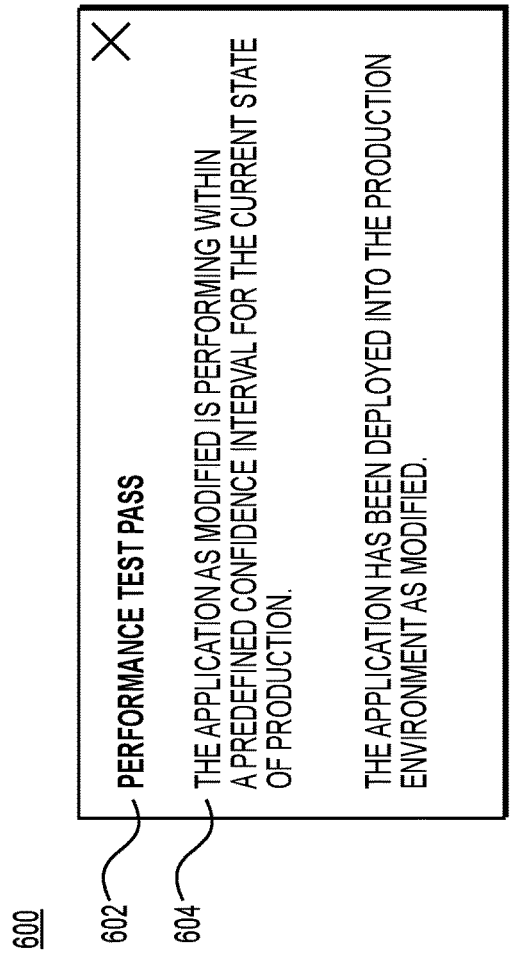
FIG. 6 depicts an exemplary notification, according to certain embodiments.

FIG. 6 depicts an exemplary performance test pass notification 600, according to certain embodiments. The notification 600 may be generated by the resource deployment system 110 and/or orchestration system 112 based on the result of the performance test received from the test execution system 228, and provided to the computing device 102 for display. In some examples, the notification 600 may be provided as a text message, an electronic mail communication, or a push notification, among other examples.

As shown, the notification 600 may include an indicator 602 that the application passed the performance test. In some examples, the notification 600 may provide details 604 associated with the "pass" status to provide the user additional context (e.g., the application passed because the application as modified is performing within a predefined confidence interval of its current production state). Additionally, in examples where the resource deployment system 110 is configured to automatically deploy the application based on the result of the performance test, the details 604 may also inform the user of the automatic deployment.

Figure 7:
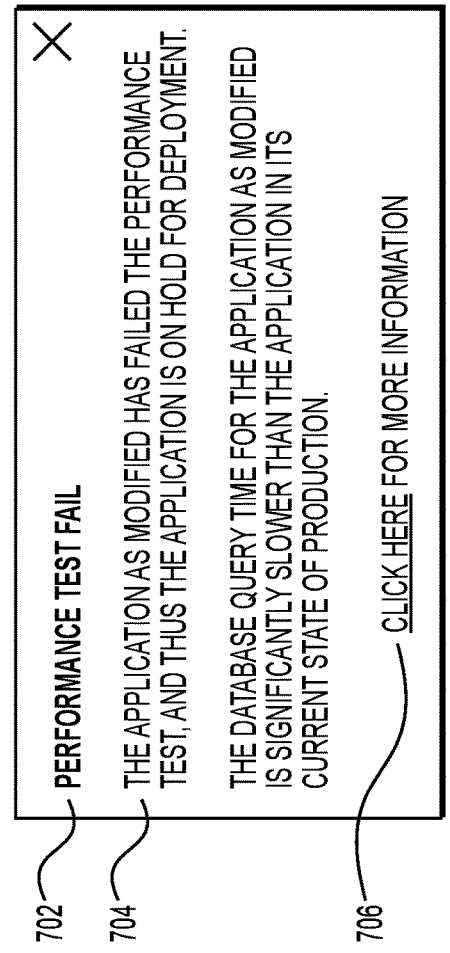
FIG. 7 depicts another exemplary notification, according to certain embodiments.

FIG. 7 depicts a performance test fail notification 700, according to certain embodiments. The notification 700 may be generated by the resource deployment system 110 and/or orchestration system 112 based on the result of the performance test received from the test execution system 228, and provided to the computing device 102 for display. In some examples, the notification 700 may be provided as a text message, an electronic mail communication, or a push notification, among other examples.

As shown, the notification 700 may include an indicator 702 that the application failed the performance test. In some examples, the notification 700 may provide details 704 associated with the "fail" status to provide the user additional context. Additionally, in examples where the resource deployment system 110 is configured to automatically deploy the application based on the result of the performance test, the details 704 may also inform the user that the deployment remains on hold. Further, the details 704 may include one or more reasons for the failure included within the result, along with a link 706 to obtain additional information regarding the result.

The notifications 600, 700 described above are provided merely as an example, and may include additional, fewer, different, or differently arranged information and/or interactive control elements than depicted in FIGS. 6 and 7.

In general, any process or operation discussed in this disclosure that is understood to be computer-implementable, such as the processes or operations depicted in FIGS. 2-7, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 8:
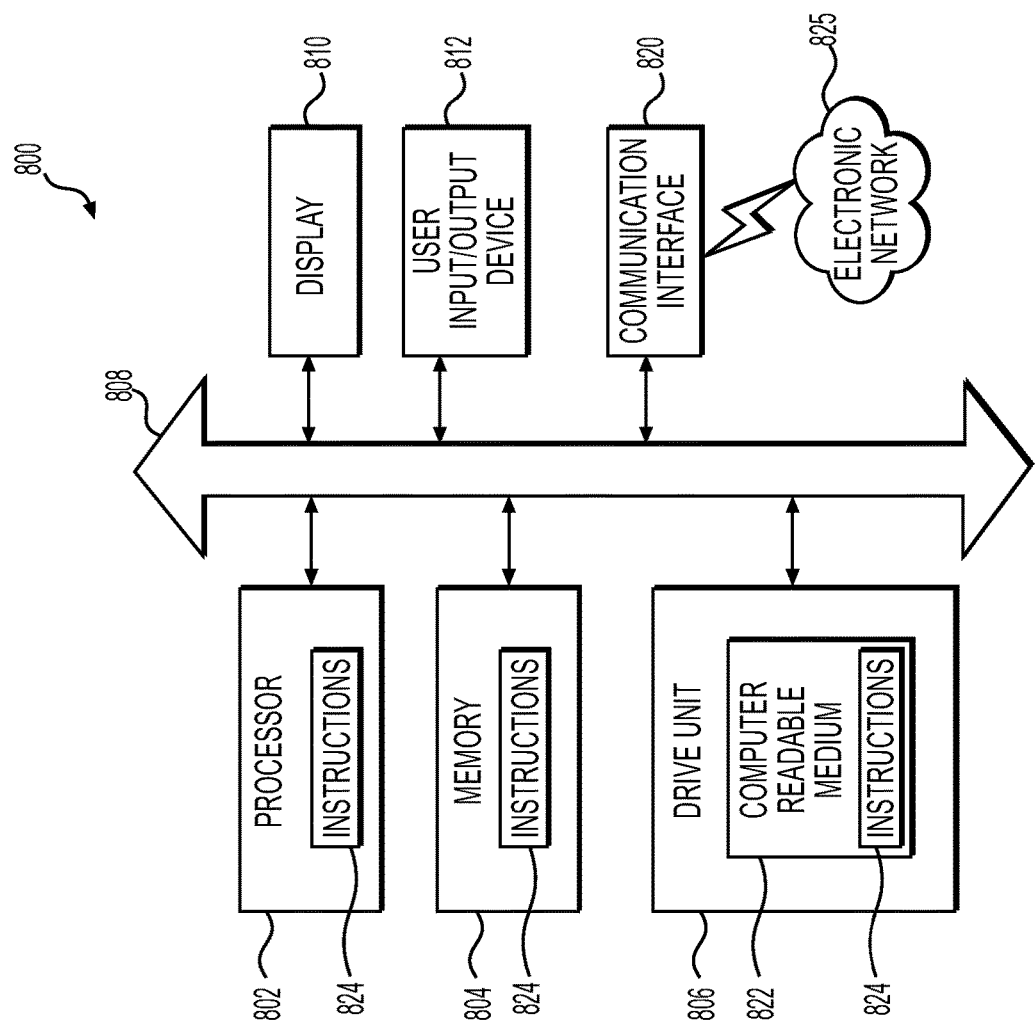
FIG. 8 depicts an example of a computer, according to certain embodiments.

FIG. 8 depicts an example of a computer 800, according to certain embodiments. FIG. 8 is a simplified functional block diagram of a computer 800 that may be configured as a device for executing processes or operations depicted in, or described with respect to, FIGS. 2-7, according to exemplary embodiments of the present disclosure. For example, the computer 800 may be configured as the user computing device 102, one of the server-side systems 108, and/or another device according to exemplary embodiments of this disclosure. In various embodiments, any of the systems herein may be a computer 800 including, e.g., a data communication interface 820 for packet data communication. The computer 800 may communicate with one or more other computers 800 using the electronic network 825. The electronic network 825 may include a wired or wireless network similar to the network 106 depicted in FIG. 1.

The computer 800 also may include a central processing unit ("CPU"), in the form of one or more processors 802, for executing program instructions 824. The program instructions 824 may include instructions for running one or more applications associated with the resource deployment system 110 and/or orchestration system 112 (e.g., if the computer 800 is the computing device 102). The program instructions 824 may include instructions for running one or more operations of the server-side systems 108 (e.g., if the computer 800 is a server device or other similar computing device of one or more of the respective server-side systems 108). The computer 800 may include an internal communication bus 808, and a drive unit 806 (such as read-only memory (ROM), hard disk drive (HDD), solid-state disk drive (SDD), etc.) that may store data on a computer readable medium 822, although the computer 800 may receive programming and data via network communications. The computer 800 may also have a memory 804 (such as random access memory (RAM)) storing instructions 824 for executing techniques presented herein, although the instructions 824 may be stored temporarily or permanently within other modules of computer 800 (e.g., processor 802 and/or computer readable medium 822). The computer 800 also may include user input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for predicting application performance metrics, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for orchestrating application performance testing using state machines, the method comprising:

receiving a request to run a performance test on an application, wherein at least a portion of information received within the request includes one or more infrastructure components of the application and one or more services of the application;

generating a unique identifier for a state machine assigned to orchestrate the performance test;

providing at least the portion of the information and the unique identifier to the state machine;

creating, by the state machine, a performance testing environment for the application by causing a deployment of the one or more infrastructure components and the one or more services of the application in the performance testing environment, wherein each deployment is associated with the unique identifier;

generating, by the state machine, a script for the performance test based on one or more application performance metrics associated with the application;

causing, by the state machine, a performance test to be generated in accordance with the script and run on the application in the performance testing environment; and upon a completion of the performance test, destroying, by the state machine, the performance testing environment by causing a destruction of the one or more infrastructure components and the one or more services of the application deployed in the performance testing environment in association with the unique identifier.

2. The method of claim 1, wherein causing the deployment of the one or more infrastructure components and the one or more services of the application in the performance testing environment further comprises:

retrieving, from a code hosting system, a configuration file for the one or more infrastructure components and the one or more services of the application; and initiating execution of a set of one or more tasks by an environment management system to deploy the one or more infrastructure components and the one or more services of the application based on the configuration file.

3. The method of claim 2, further comprising:

modifying a copy of the configuration file using a library to remove any information from the configuration file related to environments other than the performance testing environment; and initiating execution of the set of one or more tasks by the environment management system to deploy the one or more infrastructure components and the one or more services of the application based on the modified copy of the configuration file.

4. The method of claim 3, wherein the configuration file is retrieved from a first repository of the code hosting system, a forked repository of the first repository associated with the unique identifier is generated on the code hosting system to store the modified copy of the configuration file, and destroying the performance testing environment further comprises:

causing a destruction of the forked repository based on the unique identifier.

5. The method of claim 2, wherein causing the destruction of the one or more infrastructure components and the one or more services of the application deployed in the performance testing environment in association with the unique identifier comprises:

verifying that the one or more infrastructure components and the one or more services of the application are deployed; and initiating execution of a set of one or more tasks by the environment management system to destroy the one or more infrastructure components and the one or more services of the application deployed in association with the unique identifier.

6. The method of claim 1, wherein the one or more infrastructure components and the one or more services of the application are deployed in the performance testing environment in a first order, and destroyed in a second order that is a reverse order of the first order.

7. The method of claim 1, wherein creating the performance testing environment further comprises:

causing deployment of one or more mock application programming interfaces (APIs) in the performance testing environment for the application to communicate with as the performance test is run on the application in the performance testing environment, wherein each of the one or more mock APIs is associated with the unique identifier.

8. The method of claim 7, wherein destroying the performance testing environment further comprises:

causing destruction of the one or more mock APIs associated with the unique identifier.

9. The method of claim 1, further comprising:

receiving the one or more application performance metrics associated with the application from a workload modeling system, wherein the one or more application performance metrics are determined by the workload modeling system based on at least one of: a first plurality of datasets of performance metrics for the application collected by an application monitoring system, or a second plurality of datasets of performance metrics for another application having a related context to the application collected by the application monitoring system.

10. The method of claim 9, wherein the workload modeling system executes a machine learning model trained to predict the one or more application performance metrics.

11. The method of claim 1, wherein receiving the request to run the performance test on the application comprises:

automatically receiving the request from a resource deployment system in response to the resource deployment system detecting the application is a new application or a modified existing application for deployment into a production environment.

12. The method of claim 11, further comprising:

receiving a result of the performance test, wherein the result of the performance test is provided to the resource deployment system, and the resource deployment system is configured to automatically deploy the application into the production environment when the result indicates the application passed the performance test, and prevent the application from deploying into the production environment when the result indicates the application failed the performance test.

13. A system for orchestrating application performance testing using state machines, the system comprising:

at least one memory storing instructions; and at least one processor configured to execute the instructions to cause a state machine to perform operations including:

receiving at least a portion of information included in a request to run a performance test on an application, the portion including a plurality of components of the application;

retrieving, from a code hosting system, a plurality of configuration files for the plurality of components of the application;

modifying copies of the plurality of configuration files using a library to remove any information from the plurality of configuration files related to environments other than a performance testing environment;

causing a deployment of the plurality of components of the application in the performance testing environment based on the modified copies of the plurality of configuration files;

generating a script for the performance test based on one or more application performance metrics associated with the application;

causing a performance test to be generated in accordance with the script and run on the application in the performance testing environment; and upon a completion of the performance test, causing a destruction of the plurality of components of the application in the performance testing environment.

14. The system of claim 13, wherein the plurality of components are deployed in a first order, and destroyed in a second order that is a reverse order of the first order.

15. The system of claim 13, wherein the plurality of configuration files are retrieved from a first repository of the code hosting system, and the operations further comprise:

causing generation of a forked repository of the first repository on the code hosting system to store the modified copies of the plurality of configuration files; and upon the completion of the performance test, causing destruction of the forked repository.

16. The system of claim 13, further comprising:

causing deployment of one or more mock application programming interfaces (APIs) in the performance testing environment for the application to communicate with as the performance test is run on the application in the performance testing environment; and upon the completion of the performance test, causing destruction of the mock APIs in the performance testing environment.

17. The system of claim 13, the operations further comprising:

receiving the one or more application performance metrics associated with the application from a workload modeling system configured to determine the one or more application performance metrics.

18. The system of claim 13, wherein the state machine is assigned a unique identifier, and the unique identifier is associated with the deployment of the plurality of components of the application in the performance testing environment for use in subsequently identifying the plurality of components of the application for destruction in the performance testing environment.

19. The system of claim 18, wherein the unique identifier is further associated with the script and the performance test.

20. A method for orchestrating application performance testing using state machines, the method comprising:

receiving at least a portion of information included in a request to run a performance test on an application, the portion including a plurality of components of the application;

causing a deployment of the plurality of components of the application in a performance testing environment in a first order;

generating a script for the performance test based on one or more application performance metrics associated with the application;

causing the performance test to be generated in accordance with the script and run on the application in the performance testing environment; and upon a completion of the performance test, causing destruction of the plurality of components of the application deployed in the performance testing environment in a second order that is a reverse order of the first order.

* * * * *